F. A. JOSEPH.
TWIST DRILL.
APPLICATION FILED OCT. 15, 1919.

1,407,546.

Patented Feb. 21, 1922.

WITNESSES
O. C. Bedell.
L. A. Paley

INVENTOR
Felix Alexander Joseph.
BY Munn & Co.
ATTORNEYS

UNITED STATES PATENT OFFICE.

FELIX ALEXANDER JOSEPH, OF HONG KONG, CHINA.

TWIST DRILL.

1,407,546.  Specification of Letters Patent.  Patented Feb. 21, 1922.

Application filed October 15, 1919. Serial No. 330,869.

(GRANTED UNDER THE PROVISIONS OF THE ACT OF MARCH 3, 1921, 41 STAT. L., 1313.)

*To all whom it may concern:*

Be it known that I, FELIX ALEXANDER JOSEPH, a subject of the King of Great Britain, and resident of Hong Kong, China, have invented a new Improvement in Twist Drills, (for which I have filed application in England, June 7, 1916, granted Mar. 22, 1917, Patent #104,797,) of which the following is a full, clear, and exact description.

This invention relates to drills and has reference more particularly to twist drills whose cutting edges are irregular in scribed outline so that the cutting edge of one flute of the drill leaves zones of metal in the hole which are cut by the cutting edges of the other flutes of the drill.

It has been found that with the drills now in use, the swarf or chips formed by the drill in a deep hole are cleared with difficulty so that the drill clogs up and has to be removed and cleaned before the drilling operation continues.

An object of this invention is to provide a drill from which the swarf or chips will be more easily cleared than from drills now in general use.

A further object of the invention is to enable drilling to be performed more economically in power than heretofore.

According to this invention the flutes forming the cutting edges are not made alike. The dissimilarity is such that the scribed outlines of the cutting edges of the flutes when superimposed cross one another one or more times so that when the drill is ground in the ordinary manner the clearance which is given to the rear of the lips will cause portions of one lip to cut in advance of corresponding portions of the other lip or lips. Drills made in accordance with this invention are characterized in that one and only one cutting edge operates in a single definite annular zone (see Fig. 7), subject to a modified construction in which the inner annular zones have the same characteristic feature, but in which the outermost annular zone is operated upon by more than one lip.

Reference is to be had to the accompanying drawing forming a part of the specification in which it is understood that the drawing is merely illustrative of one example of the invention and in which Figure 1 is an end view of the cutting edges one one form of drill with two flutes made in accordance with this invention.

Figures 2 to 6 inclusive are modifications of the drill shown in Figure 1.

Referring to the accompanying drawing by letters, $a$—$b$ and $c$—$d$ represent the cutting edges of the drill and $c^1$—$d^1$ is the position of the edge $c$—$d$ when superimposed on $a$—$b$. The line $c^1$—$d^1$ crosses $a$—$b$ at $x$ in one or more places.

Figure 1:
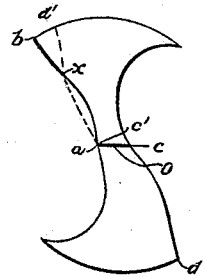

In Fig. 1 the cutting portion of one lip is $b$—$x$ and of the other lip $x$—$c^1$.

Figure 3:
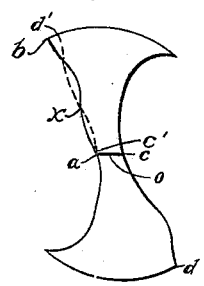
Figure 4:
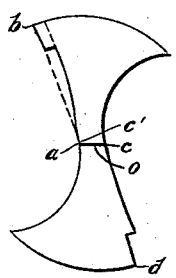
Figure 5:
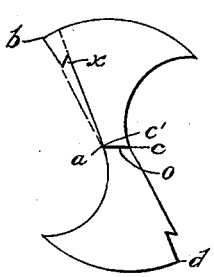

A drill formed in accordance with my invention presents flutes with cutting edges or lips whose scribed outlines, as seen from the end, are curves or broken lines which may or may not coincide at their outer ends. In the form shown in Fig. 1 these lines cross one another and do not coincide at their outer ends, whereas in the form shown in Fig. 2, the ends coincide. In the form shown in Fig. 3 the lines intersect at two points. In some cases the cutting edges may be stepped and these steps may be disposed at the points where the lines intersect, as in Fig. 4. In some cases the cutting edges may be formed so that the scribed lines cross where no cutting is done as in Fig. 5. In some cases the drill may be formed so that the outer portions of the scribed lines coincide when superimposed as shown in Fig. 6.

Figure 2:
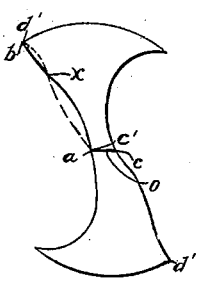
Figure 6:
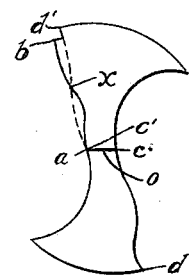

In all cases where the crossing takes place at a point on a cutting edge, and the outer ends coincide, as in Figs. 2 and 6, both lips cut in the neighborhood of that point, and they cut alternately at small distances on either side of the point. When the edges cross in a line which does no cutting, as in Figs. 4 and 5, the alternate cutting is accurately defined.

Figure 7:
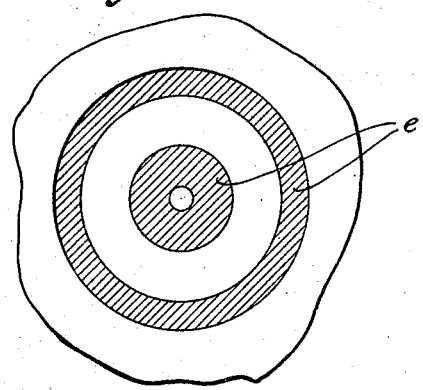
Figure 7 is a plan view of the conical end of a hole made by a drill.
Figure 8:
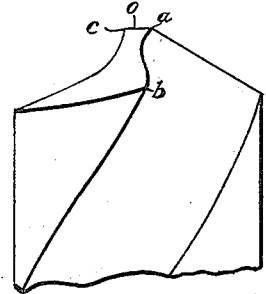
Figure 8 is an elevation of one end of the drill shown in Figure 1.

If then Fig. 7 represents a view of the conical end of the hole made by the drill, alternate annular zones of definite width are cut by the cutting edges of the drill. Thus if the drill possess two flutes, the cutting edges of one flute operate on the shaded annular zones $e$, while the cutting edges of the other operate on the unshaded annular zones. Similarly, if the drill possess more than two flutes, definite annular zones are cut by the cutting edges of each flute.

With the drill having two flutes and made in accordance with the invention, the thickness of the chip where there is alternate cutting is equal to the feed per revolution, instead of per half revolution when both lips cut similarly. In other words, the thickness of the chip is double that of the ordinary drill when the lips of the latter are accurately ground. I have found by experience that it takes less power to cut a thick chip than to cut two chips half as thick so that with the drill described, less power is needed for removing the same quantity of material. The chips are moreover narrower than the chips from an ordinary drill in which with fine feeds and deep holes the cuttings come away in long extended spirals and soon clog up the hole so that the drill has to be removed before the drilling operation is complete.

It is characteristic of drills made in accordance with this invention that one or more definite portions of each of the lips does not cut at all (that is within a certain limit of feed depending upon the amount of dissimilarity of the two lips and the clearance given the rear of the lips). In other words when such a drill is ground in the ordinary manner the clearance which is given to the rear of the lip owing to the clearance angle between the cutting edge and the material, will cause only those portions which are in advance of corresponding portions to cut. Advantage may be taken of this to make the outermost portion of the cutting edge truly radial, i. e. forming part of a radius drawn from $d$ and $d'$ to the geometrical centre $o$ of the drill. With my improved drill provided with outer radial cutting edges the chip rolls up more or less cylindrically and breaks off automatically after a very few turns. With ordinary drills, since the central portion has a definite width, it follows that the cutting edge being straight cannot be truly radial.

With ordinary drills with two flutes it often happens that through slight inaccuracies in the manufacture or in the grinding most of the cutting is done by one lip, with the result that an unbalanced torque is produced on the drill tending to twist it off or to cause an uneven application of power. With this drill, cutting by both lips is insured, and as the width of cut can be more or less accurately apportioned between the two flutes, a balanced torque is obtained.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, what I claim as new and desire to secure by Letters Patent is:

1. A twist drill in which the cutting portion of one lip alternates with the cutting portions of the other lip or lips so that the inner and outer annular zones are operated on by one and only one cutting edge, and the intermediate zone is operated on by more than one lip.

2. A twist drill in which the flutes forming the cutting edges are not alike, the dissimilarity being such that the scribed outlines of the cutting edges of the flutes when superimposed cross one another one or more times so that when the drill is ground in the ordinary manner the clearance which is given to the rear of the lips will cause portions of one lip to cut in advance of corresponding portions of the other lips substantially as described.

3. A twist drill in which the flutes forming the cutting edges are not alike, the dissimilarity being such that the scribed outline of the cutting edges of the flutes when superimposed, cross one another one or more times so that when the drill is ground in the ordinary manner, the clearance which is given to the rear of the lips will cause portions of one lip to cut in advance of corresponding portions of the other lip or lips, said cutting edges, except the cutting edge nearest the center, being straight and at the same time radial, the flutes or cutting edges being stepped where the said lines intersect, substantially as described.

FELIX ALEXANDER JOSEPH.